March 8, 1966 P. H. CHOLET ETAL 3,239,605

INFRARED SCANNING APPARATUS

Filed Oct. 2, 1959 2 Sheets-Sheet 1

INVENTORS
PHILIP H. CHOLET
MARVIN E. LASSER

BY

Herbert Epstein

AGENT

INVENTORS
PHILIP H. CHOLET
MARVIN E. LASSER

BY

Herbert Epstein

AGENT

United States Patent Office 3,239,605
Patented Mar. 8, 1966

3,239,605
INFRARED SCANNING APPARATUS

Philip H. Cholet, Levittown, and Marvin E. Lasser, Elkins Park, Pa., assignors, by mesne assignments, to Philco Corporation, Philadelphia, Pa., a corporation of Delaware Filed Oct. 2, 1959, Ser. No. 844,058
14 Claims. (Cl. 178—6.8)

This invention relates to a novel system for producing a signal representative of an electromagnetic image, in particular an image composed of far-infrared radiation. The invention also relates to a system for translating invisible images into visible ones.

Infrared detection systems are finding increasing use in military reconnaissance applications heretofore served by radar because such systems, unlike radar, do not emit a signal which an enemy might detect, and because infrared images can be highly resolved by using relatively compact optical systems whereas relatively large and cumbersome antennas are needed to obtain high-resolution radar images.

A detection system which is particularly sensitive to radiations falling within the near and medium infrared spectrum is described and claimed in the co-pending application of Marvin E. Lasser, Serial No. 824,644, filed July 2, 1959, and entitled "Electrical Apparatus." In this system the infrared image to be reproduced is focused on a surface of a semi-conductive body (e.g. silicon) whose transmissivity for the infrared radiation forming the image is reducible at any region thereof in response to impingement of an electron beam on that region. An electron beam is scanned across a surface of the body through which the infrared radiation forming the image must pass. As a result of this scansion the transmissivity of different regions of the body is succesively reduced. Accordingly the total intensity of radiation from the image transmitted through the scanned surface of the body is varied by an amount dependent on the radiation intensity of the image element incident on the region of the surface then being impinged by the electron beam.

To convert these intensity variations into a signal representative of the scanned image, a detector responsive to the radiation composing the image is arranged to receive the radiation transmitted through the scanned surface. To provide a visible display of the detected image, e.g. on the screen of a cathode-ray picture tube, this signal is utilized to intensity-modulate the beam of the picture tube, which beam is also scanned in coordination with the scansion of the surface of the semiconductive body. Preferably the infrared detector is cooled to extremely low temperatures, thereby to obtain therefrom an image-representative signal having a good signal-to-noise ratio.

The aforedescribed infrared detection system represents a substantial improvement over prior-art infrared detection systems in that it produces image-representative signals having superior signal-to-noise ratios and requires no complex and slow-moving mechanical scansion arrangements. However the foregoing system is itself subject to two limitations. More particularly its image-representative signal is susceptible to distortion by rapid changes in the average intensity of the infrared image. In addition, unless the semiconductive body is composed of intrinsic material, the system tends to become less sensitive as the wavelength of the incident radiation extends into the far infrared region because the transmissivity of infrared radiation by the semiconductive body decreases with increasing wavelength of the infrared radiation.

Accordingly an object of our invention is to provide an improved system for producing a signal representative of an electromagnetic image.

Another object is to provide a system which is especially well suited for producing electrical signals representative of long-wave infrared images.

Another object is to provide an image-detecting system whose output signal is not substantially distorted by relatively rapid changes in the average intensity of the image detected thereby.

Another object is to provide an infrared image-detecting system which is particularly useful in military reconnaissance activities.

Another object is to provide an image-detecting system which is simple in structure and reliable in operation.

The foregoing objects are achieved by providing a system in which an electromagnetic radiation image to be reproduced is formed on a surface of a body of material whose reflectivity for the image radiation is variable, e.g. increasable, at any region thereof in response to impingement of corpuscular particles on said region. These corpuscular particles may be charged particles such as electrons, protons or alpha particles, or energetic photons, e.g. ultraviolet radiation. Means are provided for scanning a beam of these particles over a surface of the body which is either coincident with or closely adjacent that on which the radiation image is formed. As a result of this scansion the reflectivity of different regions of the body is successively increased by the beam and the elements of image radiation incident on the successively scanned regions are reflected in succession from the body.

To produce an electrical signal representative of the scanned image, a detector responsive to the radiation composing the image is arranged to receive the radiation reflected from the body. Because substantially only that radiation incident on the region of the body concurrently impinged by the beam is reflected at any instant from the body, the signal produced by the detector in response to this reflected radiation is relatively unaffected by even marked and rapid changes in the average intensity of the image. Where an image composed of infrared radiation, in particular far-infrared radiation, is to be detected, the body is constituted of a semiconductive substance, e.g. silicon. Because the reflectivity of semiconductive bodies for a given scanning beam intensity increases for increasingly long-wave infrared radiation, the system is highly sensitive to far-infrared images.

To provide a visible display of the detected image, e.g. on the screen of a cathode-ray picture tube, the signal developed by the detector may be utilized to intensity-modulate the beam of the picture tube, which beam is scanned in coordination with the scansion of the surface of said body by the beam of corpuscular particles. Moreover since the detector is required to respond only to the radiation reflected from the semiconductive body, it may be physically separated from the scanned body and the apparatus for scanning it. When so separated, the detector may be readily cooled to extremely low temperatures by the use of simple cooling means. Because the detector is cooled the image-representative signal generated thereby has a good signal-to-noise ratio.

The invention will be understood more fully from a consideration of the following description taken in connection with accompanying drawings in which.

Figures 1, 2:
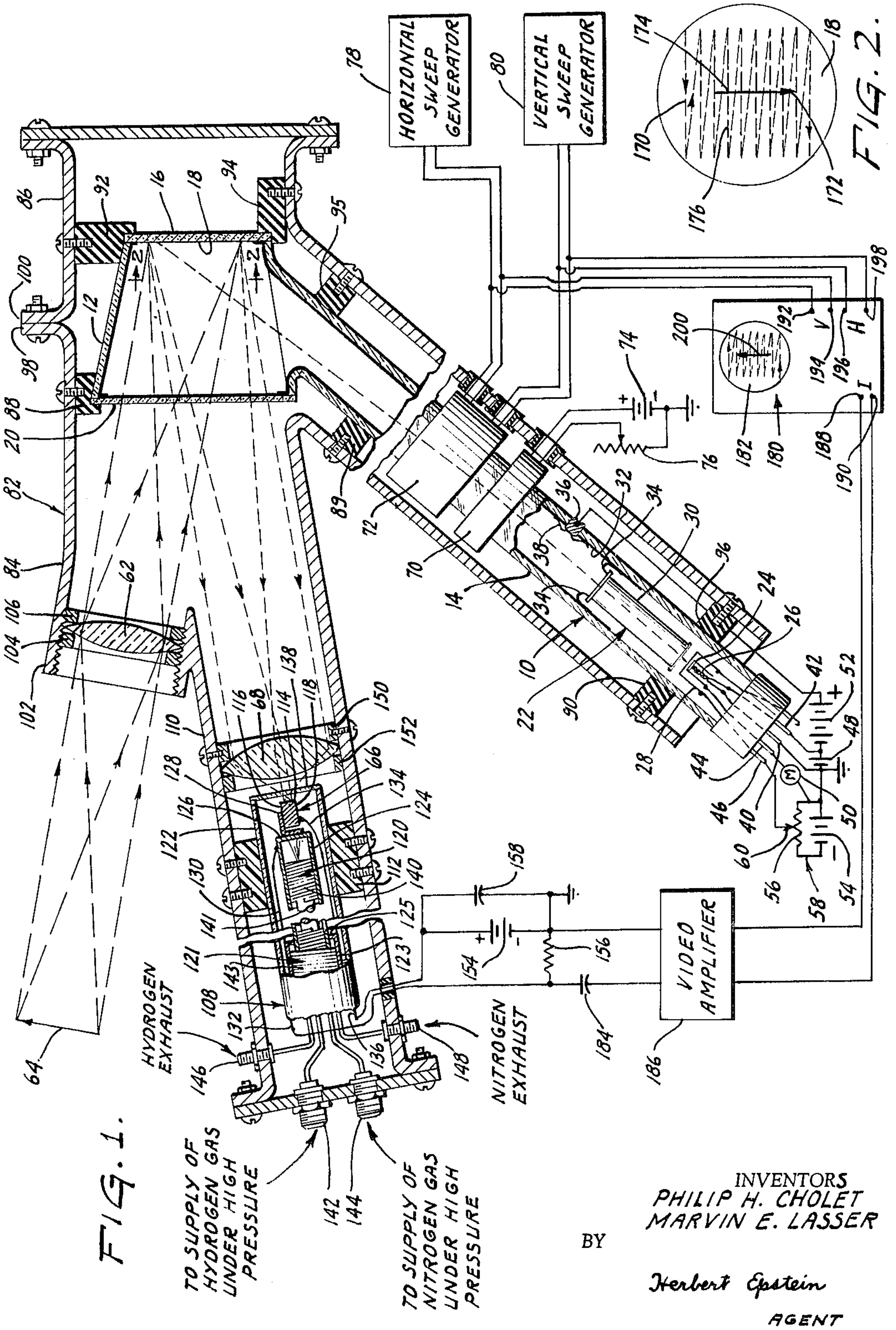
FIGURE 1 is a diagram of an image detection system according to the invention.
FIGURE 2 is a diagrammatic representation of a raster scanned by the apparatus of FIGURE 1.

An image-detection system according to the invention, which is particularly useful for generating an electrical signal representative of an image composed of long-wave infrared radiation, e.g. radiation in the 7 to 13 micron band, is shown in FIGURE 1. This apparatus includes a tube 10 which comprises an evacuated glass envelope having a substantially frusto-conical member 12 and a cylindrical neck 14 joined thereto. A thin disk 16 composed of semiconductive, monocrystalline silicon and having a substantially plane surface 18 is sealed onto the smaller end of member 12 and an infrared-transmissive window 20, which may also be composed of monocrystalline silicon, is sealed onto the larger end of member 12. An electron gun 22 is positioned within neck 14 coaxially therewith, and both neck 14 and gun 22 are oriented with respect to member 12 so that gun 22 can project an electron beam against surface 18. Gun 22 comprises a cathode 24, a heater 26 therefor, a control electrode 28 and an anode 30. A conductive coating 32, e.g. of aquadag is applied to the entire interior surface of member 12, to narrow peripheral portions of disk 16 and window 20 adjoining member 12 and to a portion of the interior surface of neck 14. Anode 30 is electrically connected to this coating by means of metal spring fingers 34 which press thereagainst. A metal connector 36 sealed into neck 14 and having spring fingers 38 pressing against coating 32 provides an external electrical connection to coating 32 and anode 30. Tube prongs 40 and 42 provide external electrical connections to heater 26, a prong 44 provides an electrical connection to cathode 24, and a prong 46 provides an electrical connection to cathode 24, and a prong 46 provides an electrical connection to control electrode 28.

A battery 48 energizes heater 26. Cathode 24 is connected to a point of reference potential by way of a milliammeter 50, and a battery 52 supplies a positive voltage to anode 30 and coating 32. Typically this anode voltage is between about 10 and 30 kilovolts although it may be as high as 140 kilovolts. The intensity of the beam current of the tube is controlled by applying to control electrode 28 a potential negative with respect to that of cathode 24. This potential is supplied by a battery 54 shunted by the resistance element 56 of a potentiometer 58. The positive terminal of battery 54 is connected to cathode 24 and the movable arm 60 of potentiometer 50 is connected to control electrode 28. Typically the electron beam has a diameter of 0.01 centimeter and a current intensity of one milliampere.

In addition to tube 10 and its associated power supply, the system of the invention comprises a lens 62 for forming on surface 18 of silicon disk 16 an image of a source 64 of infrared radiation. The system also comprises an infrared detector 66 and a lens 68 for directing onto detector 66 infrared radiation reflected from surface 18. Lenses 62 and 68 are composed of a substance transmissive of the infrared radiation constituting the image, e.g. arsenic trisulfide, and are oriented so that their axes intersect at surface 18 and make equal angles therewith.

A coil 70 is provided for focusing the electron beam generated by gun 22 on surface 18 and a deflection yoke 72 is provided for scanning this beam thereover. Both of these coils are mounted coaxially with tube neck 14. Focusing coil 70 is energized by a battery 74 connected thereto by way of a rheostat 76, while deflection coil 72 is supplied with appropriate horizontal and vertical sweep signals by horizontal and vertical sweep generators 78 and 80 respectively which may be of conventional construction.

The foregoing components of the system are mounted within a telescope assembly 82 which comprises a first part 84 and a second part 86. More particularly the frusto-conical member 12 and neck 14 of tube 10 are rigidly supported by insulators 88, 89 and 90 secured to part 84, and by insulators 92, 94, 95 and 96 secured to part 86. In this regard parts 84 and 86 are shaped to accommodate neck 14 of tube 10 and have flanges, e.g. 98 and 100, at which they are bolted together after tube 10 has been inserted therein.

Lens 62 is rigidly supported within a tubular section 102 of part 84 by rings 104 and 106. In addition cell 108 housing and mounting infrared-responsive detector 66 is supported within a second tubular section 110 of part 84 by ring 112 secured to section 110. In the embodiment shown detector 66 comprises a body of monocrystalline germanium doped with substantially equal atomic concentrations of zinc and antimony, e.g. about $10^{15}$ atoms of each per cubic centimeter of the germanium. Body 66 is a rectangular solid of square cross-section whose rectangular sides are typically about 2 millimeters wide and 10 millimeters long. When body 66 is cooled to a temperature of about 30° K., it becomes responsive to infrared radiation having wavelengths up to 14 microns incident on its square face 114 to decrease the resistance between its rectangular faces 116 and 118 by an amount dependent on the intensity of the incident radiation. To maintain body 66 at its operating temperature of 30° K., cell 108 comprises a Dewar flask containing two cryostats 120 and 121.

More particularly cell 108 comprises an exterior cylindrical portion 122 and two coaxial cylindrical portions 123 and 124 positioned within portion 122. Portion 123 has a diameter intermediate that of portions 122 and 124, is somewhat shorter than portion 124 and is jointed thereto by an annular floor 125 which provides a gas-tight seal between the two portions. Portion 124 is somewhat shorter than exterior portion 122, has a closed end 126, and is typically composed of copper. One arm of an L-shaped metal member 128 also composed of copper is soldered to the base of end 126, and surface 116 of body 66 is soldered to the other arm of L-member 128 extending out from end 126. External electrical connection is afforded to surface 116 of body 66 by a conductor 130 soldered to portion 124 and to a terminal 132, while external electrical connection is afforded to body surface 118 by a second conductor 134 soldered thereto and to a second terminal 136. An infrared-transmissive window 138 composed for example of barium fluoride is hermetically sealed to the end of portion 122 adjacent body 66, and the space between portions 122 and 123 is evacuated, thereby to insulate thermally body 66.

To cool body 66 to about 30° K. a spray of liquid hydrogen having a boiling point of about 20° K. is produced against end 126 of portion 124 by cryostat 120. In the form shown cryostat 120 comprises a coil 140 of metal tubing of very small diameter, e.g. one mil steel tubing of the type used to fabricate hypodermic needles. This coil is wound upon a mandrel 141 whose diameter is such that coil 140 fits snugly within re-entrant portion 124. The tubing of coil 140 is pinched off and secured to mandrel 141 at the end thereof adjacent end 126 and a very small orifice is made in the tubing at a region thereof facing end 126. Filtered hydrogen gas under high pressure, e.g. 1500 pounds per square inch, is supplied to the other end of coil 140 by way of a high pressure coupling 142. Prior to reaching the orifice this hydrogen gas is cooled to a temperature of about 80° K., i.e., a temperature below its Joule-Thomson inversion temperature, by the second cryostat 121 contained within portion 123 of cell 108 and having a coil 143 whose orifice faces annular floor 125. The latter cryostat is supplied with filtered nitrogen gas under high pressure, e.g. about 1500 pounds per square inch, by way of a high pressure coupling 144. The pressure of this gas falls greatly as it emerges from the orifice of coil 143. As a result its temperature falls to about 77° K. and it liquifies. In addition the cold vapors of this nitrogen gas flow back over coil 143 and against the wall of cylindrical portion 124. As a result the nitrogen gas within coil 143 is chilled facilitating its refrigeration, and coil 140, through which the hydrogen gas flows, is cooled by heat transfer therefrom through portion 124 adjoining coil 143. To achieve efficient heat transfer from hydrogen coil 140 to the cold nitrogen gas flowing within portion 123, coil 140 is fitted snugly against portion 124, which is made of a good heat conductor, e.g. copper. Because the hydrogen is thus cooled below its Joule-Thomson inversion temperature and its pressure decreases greatly as it emerges from the orifice of coil 140, the temperature of the emergent hydrogen falls to about 20° K. As a result, end 126, which is contacted by this extremely cold hydrogen, and member 128, which is soldered to cup 126, are chilled to comparably low temperatures, e.g. about 30° K. Because germanium body 66 is in excellent thermal connection with member 128 it too is cooled to about 30° K.

The hydrogen and nitrogen gases are exhausted from cell 108 by way of couplings 146 and 148 respectively. For reasons of economy and safety these gases preferably are recompressed and recycled through the system.

Lens 68 is fixedly mounted within section 110 between surface 114 of germanium detector 66 and surface 18 of tube 10, by a metal ring 150 secured to section 110 and a ring-like spring 152 compressed therewithin. The position and focal length of lens 68 are such that it concentrates infrared radiation reflected from surface 18 of disk 16 onto surface 114 of body 66.

To produce a voltage dependent upon the resistance exhibited by body 66 between its surfaces 116 and 118, a battery 154 and a resistor 156 are connected in series relationship therewith. Resistor 156 has a value which is preferably approximately equal to the dark resistance of body 66 between its surfaces 116 and 118, thereby to minimize the amplitude of the noise voltage generated by body 66 and resistor 156. Typically resistor 156 has a value of 5 megohms. Battery 154 typically supplies about 100 volts and is bypassed for alternating currents by a capacitor 158.

In operation the source 64 of infrared radiation is imaged by lens 62 on surface 18 of silicon disk 16. The electron beam of tube 10 focused by coil 70 on surface 18 is scanned thereover by yoke 72 in response to sweep signals supplied by sweep generators 78 and 80. The scansion pattern is diagrammatically shown in FIGURE 2 at 170 and the image formed by lens 62 on surface 18 is shown therein at 172. As the electron beam scans surface 18 it renders the region of surface 18 instantaneously impinged thereby much more highly reflective of infrared radiation than the remainder of surface 18. Accordingly where infrared radiation of image 122 is incident on the region contemporaneously impinged by the electron beam, e.g. region 174, this radiation is strongly reflected by the image region toward germanium detector 66 and is focused upon surface 114 thereof by lens 68. In response to the infrared radiation focused thereon, the resistance of body 66 between surfaces 116 and 118 decreases by an amount dependent upon the intensity of this radiation. Because body 66 is connected in series relationship with battery 154 and resistor 156, the current flowing through resistor 156 and hence the potential difference thereacross increases in response to this decrease in the resistance of body 66. By contrast where no infrared radiation is incident on the region of surface 18 instantaneously impinged by the electron beam, e.g. region 176, substantially no infrared radiation is reflected by surface 18 to body 66. As a result no change occurs at this time in the potential difference across resistor 156. From the foregoing it is apparent that the magnitude of the potential difference across resistor 156 varies in exact correspondence to variations in the intensity of the infrared radiation reflected from surface 18 of disk 16 in response to the scansion of this surface by the electron beam of tube 10. Hence these variations in the magnitude of this potential difference constitute a signal representative of the infrared image focused on surface 18. Because only the single small region of surface 18 instantaneously being impinged by the electron beam has enhanced reflectivity, the latter signal is not substantially distorted by even large and rapid changes in the average intensity of this image.

The image-representative signal so obtained can be used to produce a visible image of the invisible infrared source. One simple way of producing this image is illustrated in FIGURE 1. In this arrangement the image-reproducing device is a conventional cathode-ray oscilloscope 180 comprising a cathode-ray tube having a screen 182. The image-representative signal developed across resistor 156 is supplied via a blocking capacitor 184 to a video amplifier 186 of appropriate gain and bandwidth, and the amplified signal is then applied to the intensity-modulation terminals 188 and 190 of oscilloscope 180 thereby to intensity-modulate the electron beam thereof in conventional manner. In addition this beam is scanned across screen 182 in coordination with the scansion of electron beam of tube 10, e.g. by supplying the output signal of vertical sweep generator 80 to the vertical deflection terminals 192 and 194 of oscilloscope 180 and by supplying the output signal of horizontal sweep generator 78 to the horizontal deflection terminals 196 and 198 of oscilloscope 180. In order to reinvert the inverted image 172 of source 64 formed on surface 18 by lens 62, the output signals of sweep generators 78 and 80 are respectively applied to these terminals in senses opposite those in which they are applied to the horizontal and vertical deflection windings of yoke 72. Alternatively the inversion of the image may be achieved in well-known manner by appropriately positioning a second convex lens (not shown) between source 64 and disk 16. By utilizing either of these arrangements an erect, visible image 200 of invisible, infrared source 64 is formed on screen 182 of oscilloscope 180.

Figures 3, 4:
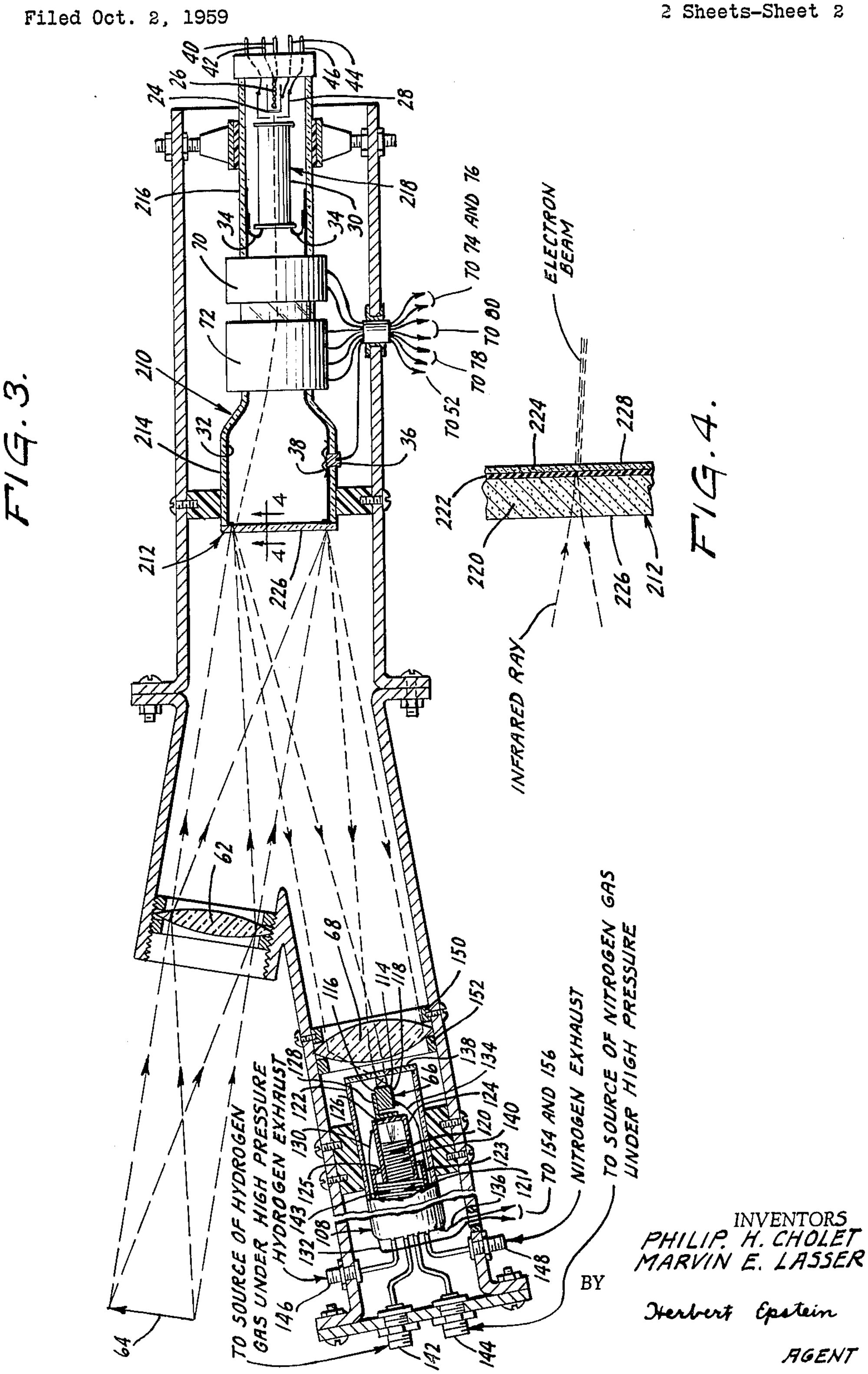
FIGURE 3 is a diagram of a portion of another image detection system according to the invention.
FIGURE 4 is a sectional view of a portion of the apparatus of FIGURE 3.

The specific structure of the system of the invention can be varied in many ways. For example, the structure of the scanning tube can be altered so that scansion occurs on a surface of the scanned semiconductive body opposite and closely adjacent that on which the infrared image is formed. FIGURE 3 illustrates such a tube 210 as embodied in an arrangement similar to that of FIGURE 1, and FIGURE 4 illustrates an enlargement of a portion of the scanned disk 212 of tube 210.

More particularly tube 210 comprises an evacuated glass envelope having a cylindrical body 214 and a cylindrical neck 216 of somewhat smaller diameter joined coaxially thereto. An electron gun 218, which in the embodiment shown has the same structure as gun 22 of tube 10 (see FIGURE 1), is supported within neck 216 coaxially therewith. In addition disk 212 is sealed onto the open end of cylindrical body 214. An enlarged cross-sectional view of disk 212 is shown in FIGURE 4. As shown therein disk 212 comprises three layers—220, 222 and 224 respectively. Layer 220, whose surface 226 forms an exterior wall of the tube, is composed of a substance transmissive of the infrared radiation to be detected, e.g. silicon. It is sufficiently thick to be mechanically rigid and to withstand atmospheric pressure but thin enough to minimize absorption thereby of the infrared radiation to be detected. Typically it is about one millimeter thick. Layer 222 is composed of a substance which also is transmissive of the infrared radiation to be detected but which does not generate hole-electron pairs upon impingement by an electron beam. Typically it is a thin film of barium fluoride evaporated onto the surface of layer 220 opposing surface 226. Layer 224 is composed of a semiconductive substance which becomes highly reflective where impinged by a beam of electrons. In the present embodiment layer 224 is a thin film of silicon evaporated onto barium fluoride layer 222. Disk 212 is sealed onto cylindrical body 214 of tube 210 in a orientation such that surface 228 of layer 224 is impinged by the electron beam generated by gun 218.

In order that the regions of silicon film 224 impinged by the electron beam may reflect efficiently infrared radiation incident on the surface thereof opposite surface 228, film 224 preferably has a thickness no greater than that which reduces the charge density and energy of an electron beam incident on surface 228 by a factor of $1/e$, i.e. 0.37, at the surface of film 224 adjoining film 222 (where $e$ is the Napierian base 2.718 . . .). Typically film 224 has a thickness of 10 microns. The barium fluoride film 222 should be sufficiently thick to reduce to a negligible value the charge density and energy of beam electrons reaching the surface of silicon layer 224 adjoining film 222, thereby to prevent these electrons from producing infrared-absorbing regions in layer 220. In the present case, in which the beam current density is about 13 amperes/cm.$^2$ and the accelerating voltage is about 30 kilovolts, this thickness should be of the order of 50 microns. In addition, where the infrared radiation to be detected is relatively monochromatic, the efficiency of the system can be enhanced by selecting a thickness for layer 222 for which it does not reflect the infrared radiation incident thereon. This thickness is substantially equal to an odd-integer multiple of half the wavelength in film 222 of the incident radiation.

The operation of the system of FIGURE 3 is substantially the same as that of FIGURE 1 and hence will not be discussed in detail. Briefly an infrared image of source 64 is focused by lens 62 on the surface of silicon film 224 adjacent layer 222. The opposing surface of this film is scanned by the electron beam generated by gun 218, focussed by coil 70 and deflected by yoke 72 in the manner set forth in the foregoing discussion of FIGURE 1. As a result of this scansion successive elements of the infrared radiation constituting the focused image are reflected from the successively scanned portions of film 224, each of which becomes highly reflective upon impingement by the electron beam. The reflected radiation is concentrated by lens 68 onto germanium detector 66 and the resistance thereof is modulated by an amount dependent on the intensity thereof. These variations in resistance are translated into variations in the potential difference across resistor 156 (see FIGURE 1), and these potential difference variations constitute an image-representative signal which may be used to produce a visible image of the invisible infrared source.

The structure of tubes 10 and 210 may be modified in still other ways. For example, disk 16 and window 20 of tube 10, and layers 220 and 224 of tube 210 may be composed of semiconductors other than silicon, e.g. germanium, gallium, arsenide, indium arsenide, indium antimonide, indium phosphide, or gallium phosphide. In each instance the semiconductor selected for use as a window should be transmissive of the radiation to be detected. In addition disk 16 of tube 10 need not be composed of a monocrystalline semiconductor but alternatively may be composed of a polycrystalline semiconductor, e.g. cast silicon.

Electron guns 22 and 218 of tubes 10 and 210 may be replaced by means generating corpuscular particles, other than electrons, which have energies sufficient to vary the reflectivity for infrared radiation of disk 16 and layer 224 respectively upon impingement thereon. As aforementioned these other corpuscular particles may be charged particles such as alpha particles or protons, or photons having energies in excess of the gap energy of the semiconductor, e.g. ultraviolet light.

The specific electron-beam focusing and deflection system shown in FIGURES 1 and 3 may be replaced by other conventional focusing and deflection systems, e.g. electrostatic, or partly electrostatic and partly electromagnetic. Moreover the optical system utilized to form an image of the infrared source on the scanned semiconductive body need not be that shown in FIGURES 1 and 3. For example the objective lens 62 of these systems may be replaced by an appropriate mirror system, e.g. a Schmidt or Maksutov system. In one such system the infrared radiation from the source initially passes through an appropriate corrector plate or lens onto a concave spherical mirror and is focussed thereby onto the reflective surface of the scansion tube. The radiation reflected from this surface in response to scansion thereof by the corpuscular beam of the tube passes through a centrally positioned aperture in the spherical mirror and is focused on the infrared detector by an appropriate lens.

Moreover although the specific systems described above are especially designed to detect infrared radiation whose wavelength is of the order of 10 microns, systems according to our invention are capable of detecting efficiently infrared radiation having substantially longer wavelengths. In this regard, the efficiency with which a semiconductor impinged by a beam of corpuscular particles reflects infrared radiation incident thereon increases as the wavelength of the incident radiation rises. Accordingly, to obtain sensitive detection at these longer wavelengths it is only necessary that the lenses of the system be translucent to the radiation and capable of focusing it and that the detector be responsive thereto. For example the systems of FIGURES 1 and 3 can be modified to detect far-infrared radiation having a wavelength as long as 38 microns by substituting for the zinc-antimony-doped germanium body 60 the zinc-doped germanium detector first developed by the Naval Research Laboratory and now manufactured by the Pergin-Elmer Corporation under Catalog No. PE 536–1. The latter detector, which in operation is cooled to the temperature of liquid helium (4.2° K.), typically is housed in a double-Dewar cell. The outer Dewar contains liquid nitrogen and the inner Dewar, which is in intimate thermal contact with the germanium crystal, contains liquid helium. In such a long-wave detection system lenses 62 and 68 may be composed of an alkali-metal halide, e.g. cesium iodide; disk 16 and window 20 (see FIGURE 1) may respectively be composed of silicon and cesium iodide, and layers 220, 222 and 224 (see FIGURE 3) may respectively be composed of KRS–5 (a synthetic optical crystal containing about 42 percent TlBr and 58 percent TlI and manufactured by the Harshaw Chemical Company, Cleveland, Ohio), cesium iodide, and silicon.

Although the specific image-reproducing system described above is a simple closed-circuit television arrangement, it is clear that the image-information signal generated across resistor 156 may be used to modulate a television broadcasting transmitter.

While we have described our invention by means of specific examples and in specific embodiments, we do not wish to be limited thereto, for obvious modifications will occur to those skilled in the art without departing from the scope of our invention.

What we claim is:

1. In combination: a body of material whose reflectivity for electromagnetic radiation at any region thereof is variable in response to impingement of corpuscular particles on said region; means for forming an electromagnetic radiation image on a surface of said body; means for scanning a beam of corpuscular particles over said body to vary its reflectivity adjacent said surface successively at different regions thereof; and means responsive to electromagnetic radiation and disposed to receive electromagnetic radiation reflected from said body.

2. In combination: a body composed of a substance whose reflectivity for electromagnetic radiation at any region thereof is variable in response to impingement of corpuscular particles on said region; means for forming an electromagnetic radiation image on a surface of said body; means for scanning a beam of said particles over said surface to vary the reflectivity of said surface successively at different regions thereof; and means responsive to electromagnetic radiation and disposed to receive electromagnetic radiation reflected from said surface.

3. Apparatus according to claim 2 wherein said radiation-responsive means include means for producing an electrical quantity having a value dependent upon the intensity of said received electromagnetic radiation.

4. Apparatus according to claim 2 wherein said body is composed of a semiconductor whose reflectivity for infrared radiation at any region thereof is variable in response to impingement thereon by said corpuscular particles, and wherein said means responsive to electromagnetic radiation comprise means responsive to infrared radiation.

5. Apparatus according to claim 4 wherein said semiconductor is one chosen from the group consisting of silicon, germanium, gallium arsenide, indium arsenide, indium antimonide, indium phosphide, and gallium phosphide.

6. Apparatus according to claim 4 wherein said corpuscular particles are charged particles.

7. Apparatus according to claim 4 wherein said semiconductor is silicon and said corpuscular particles are electrons.

8. Apparatus according to claim 4 wherein said radiation-responsive means include means for producing an electrical quantity having a value dependent on the intensity of said received infrared radiation.

9. Apparatus according to claim 4, said apparatus additionally comprising means for cooling said infrared radiation responsive means.

10. In combination: a body composed of a substance whose reflectivity for electromagnetic radiation at any region thereof is variable in response to impingement of corpuscular particles on said region; means for forming an electromagnetic radiation image on a first surface of said body; means for scanning a beam of said particles over a second surface of said body adjacent said first surface thereby to vary the reflectivity of said first surface successively at different regions thereof; and means responsive to electromagnetic radiation and disposed to receive electromagnetic radiation reflected from said first surface.

11. Apparatus according to claim 10 wherein said body is composed of a semiconductor whose reflectivity for infrared radiation at any region thereof is variable in response to impingement thereon by corpuscular particles, and wherein said radiation-responsive means comprise means responsive to infrared radiation.

12. Apparatus according to claim 11 wherein said semiconductor is one chosen from the group consisting of silicon, germanium, gallium arsenide, indium arsenide, indium antimonide, indium phosphide, and gallium phosphide, and said corpuscular particles are electrons.

13. An image-translating system comprising wave-generating apparatus including a body of material whose reflectivity for electromagnetic radiation at any region thereof is variable in response to impingement of corpuscular particles on said region, means for forming an electromagnetic radiation image on a surface of said body, means for scanning a beam of corpuscular particles over said body to vary the reflectivity adjacent said surface successively at different regions thereof, and means arranged to receive electromagnetic radiation reflected from said body and responsive to the last-named radiation to generate a wave; and image display apparatus responsive to an image-information signal to produce on successive elements of a screen light whose instantaneous intensity is dependent on said image-information signal, means for supplying said wave to said display apparatus as an image-information signal, and means for coordinating the production of said light on said screen with said scansion of said corpuscular beam over said body.

14. A system according to claim 13 wherein said image-display apparatus comprises a cathode-ray tube, wherein said coordinating means comprise means for scanning the electron beam of said tube over its screen in coordination with said scansion of said corpuscular beam, and wherein said system additionally comprises means coupled to said wave-supplying means and responsive to said wave to vary the intensity of said electron beam.

No references cited.

DAVID G. REDINBAUGH, *Primary Examiner.*

RALPH G. NILSON, FREDERICK M. STRADER, *Examiners.*